United States Patent [19]

Tinnes

[11] 4,076,154
[45] Feb. 28, 1978

[54] SEALING MEANS FOR THE JOINT OF A CASTING LADLE CLOSURE

[75] Inventor: Bernhard Tinnes, Zollikerberg, Switzerland

[73] Assignee: Metacon AG, Zurich, Switzerland

[21] Appl. No.: 641,872

[22] Filed: Dec. 18, 1975

[30] Foreign Application Priority Data

Jan. 16, 1975 Switzerland .............................. 531/75

[51] Int. Cl.² ............................................ B22D 41/08
[52] U.S. Cl. ................................... 222/600; 222/542; 285/284
[58] Field of Search ................ 285/284, 353; 164/337; 222/542, 561, 504, 512, 600, 598

[56] References Cited

U.S. PATENT DOCUMENTS 3,567,082   3/1971   Tinnes .............................. 222/600 X
3,831,825   8/1974   Kutzer et al. ........................ 222/600
3,931,913   1/1976   Meier ............................... 222/600 X Primary Examiner—Robert B. Reeves
Assistant Examiner—David A. Scherbel
Attorney, Agent, or Firm—Cushman, Darby & Cushman

[57] ABSTRACT

The disclosure embraces a sealing member for the joint between an outlet of a casting ladle and a closure member for the outlet and includes a rigid core member having an opening in which is located a tubular casing which fits into the aperture of the outlet of the casting ladle and a closable bore of the closure member; the rigid core member is coated with mortar material in a paste or semi-fluid form; the sealing member is encased in an air-tight package so as to prevent the mortar material from solidifying prior to its incorporation into the joint between the outlet of the casting ladle and the closure member.

5 Claims, 1 Drawing Figure

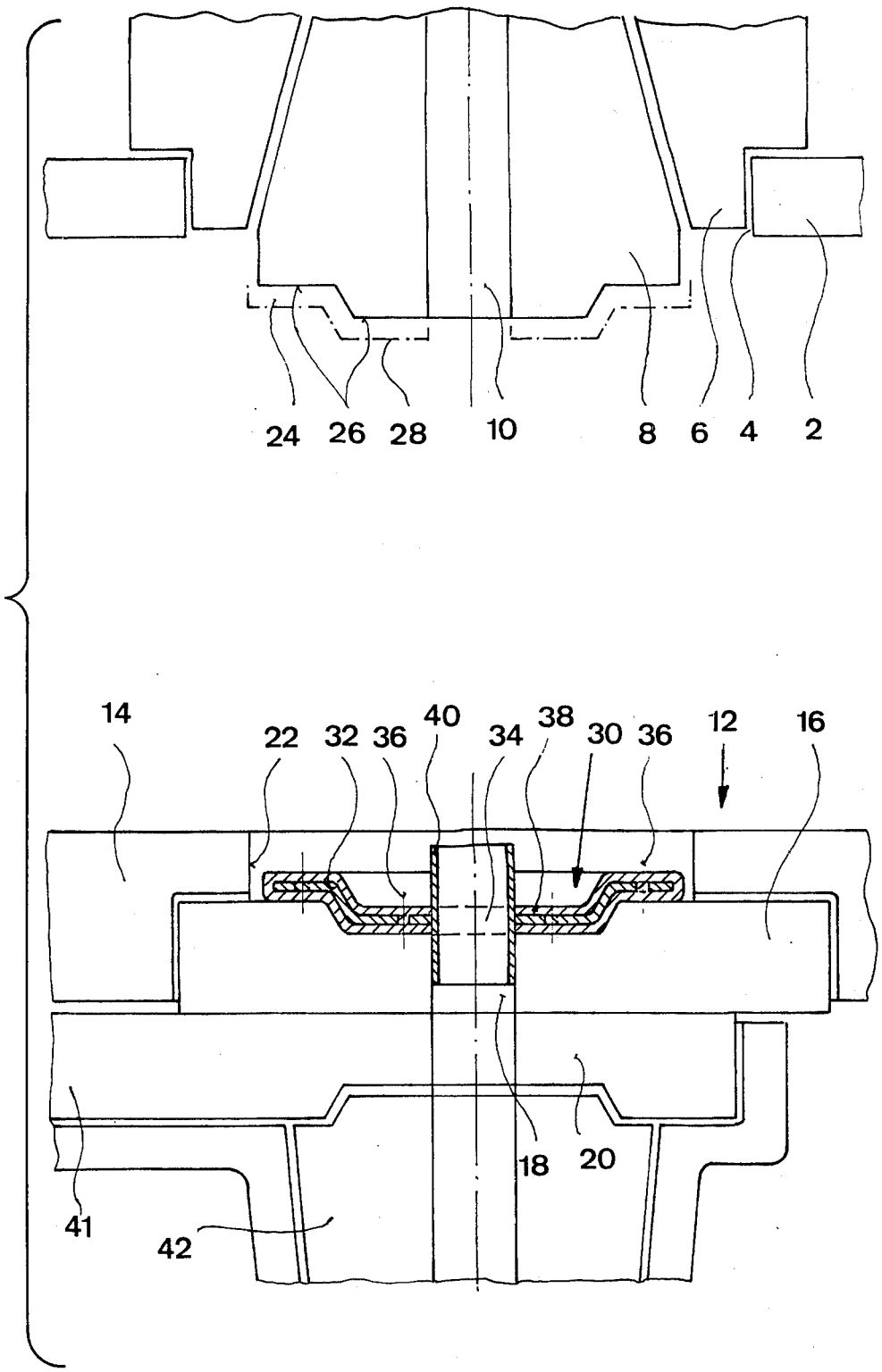

SEALING MEANS FOR THE JOINT OF A CASTING LADLE CLOSURE

BACKGROUND AND BRIEF DESCRIPTION OF THE INVENTION

The present invention relates to a novel form of sealing means for the joint between the outlet of a casting ladle, the type used to handle molten metal or the like, and the closure member for the outlet of the ladle and, more specifically, to a sealing member which can be prefabricated and packaged so as to facilitate its incorporation into a casting ladle.

As is well known, parts of the outlets of casting ladles and their closures that are exposed to the flow of molten metal, while made of sturdy, fire-resistant material, still require periodic replacement. Accordingly, attempts have been made in the past to simplify the exchange or substitution of worn parts of the closures for casting ladles as well as to improve the seals between the joints of the closures and the outlets of the ladles to which the closures are attached.

It is, of course, important to use closure members that are physically stable, as well as to form proper seals between the closure members and the outlet of the casting ladles since failure of any of these parts can result in spattering of the molten metal during its discharge from the casting ladle which is not only dangerous to persons working near the ladle, but also can result in increased production losses.

In order to simplify the substitution of new closure members on casting ladles, it has previously been proposed to employ a plug-type closure in combination with annular discs made of highly heat-resistant mineral wool as a sealer. Use of such a sealer provides the advantage that the seal could be prefabricated, thus reducing the down time that had previously been incurred with the use of mortar material, which required that the ladle be inactive until the mortar set completely.

However, seals of mineral wool, as well as other types, could only be used where the parts of the closure member and outlet of the casting ladle were physically clamped together by an auxiliary mechanism in order to obtain a tight seal at the joint between the closure member and ladle outlet. Moreover, seals of this type cannot also be used where the sealing material itself must serve as a connection or attaching means.

The present invention has for its object the provision of a prefabricated seal as described above which avoids the foregoing disadvantages by providing a sealing body having a rigid core which is coated with a plastic, i.e., still unhardened mortar material. With the arrangement of the present invention, the sealing member can be packaged in an air-tight container so as to preserve the flowability of the plastic mortar material whereby the sealing member can be ready for use without requiring the addition of other materials or parts to form an integral seal.

One of the advantages of using a plastic or flowable coating about the rigid core is that the flowable coating material will serve to smooth out any irregularities in the surfaces defining the joints when the elements are brought into contact with the sealing member. Moreover, the rigid core of the sealing member assures the provision of a stable form for the seal. This facilitates prefabrication of the seal in a desired form to fill a given joint configuration.

Of significant importance is the fact that the prefabricated seal of the present invention will function to fill the joints between the parts even while they are at an elevated temperature. In such circumstances, it is, of course, necessary to place the seal in position immediately prior to joining the closure member parts to the parts surrounding the outlet of the ladle so that premature solidification or setting of the mortar coating will not occur.

In a preferred embodiment where the seal is to be used about the outlet of a casting ladle, the rigid core is substantially in the form of a circular disc which may be flat or shaped to conform closely to the surfaces defining the joint.

Also, according to a preferred embodiment, the rigid core body is formed with indentations or holes which become filled with the plastic mortar coating and function as anchoring means to guarantee adhesion of the coating to the rigid core, as well as retard migration of the mortar coating.

Other objects and advantages will become apparent as consideration is given to the following detailed description, as well as the accompanying drawing which illustrates in cross-section the bottom portion of a casting ladle and a closure member which carries the sealing means of the present invention prior to the attachment of the closure member to the bottom of the casting ladle about the outlet thereof.

DETAILED DESCRIPTION OF THE INVENTION

Referring to the single FIGURE, there is shown an embodiment of the seal means according to the present invention in cross-section. The seal is adapted to be used with a replaceable closure member shown in the lower part of the FIGURE which is attached to the outlet member of a casting ladle depicted in the upper part of the FIGURE. The bottom wall 2 of the casting ladle has an aperture 4 in which is inserted a nozzle of fire-resistant ceramic or brick 6. A casing 8 is inserted into the nozzle 6 and is provided with a through passage 10 defining the outlet for molten metal from the casting ladle.

As generally designated at 12, a gate type valved closure member is adapted to be releasably attached to the bottom wall 2 of the ladle as by any conventional means (not shown) such as bolts or pins. The valve gate 12 includes a bottom plate member 16 which is inserted into a slide housing 14. The bottom plate 16 has a through bore 18 for the passage of molten metal. A slide plate 20 is located to face the surface of bottom plate 16 and is shiftable by conventional means relative thereto to open and close the passge 18. The slide housing 14 is formed with an aperture 22 which is of a size to fit around the external diameter of the casing 8. When the parts are assembled, a gap or joint 24 will exist between the casing 8 and the upper surface of the bottom plate 16 of the gate valve 12 as defined by the dotted line 28 shown about the lower portion of the casing 8. A gasket-type sealing means of the present invention which is generally designated at 30 is disposed in the aperture 22 of the slide housing 14. The seal 30 in its prefabricated form comprises a rigid core body 32 which may be made of hardened, fire-resistant material which, in the illustrated embodiment, is in the form of a disc, the radially inner portion of which is offset a slight degree relative to the radially outer surfaces thereof. Core body 32 is formed with an aperture 34 at its center which is substantially the same diameter as the bore 18 and passage 10. In addition, the core body 32 is provided with a plurality of holes 36 which, as will be described below, will function as anchoring means for the plastic mortar material.

The core 32, according to the present invention, is encased or coated by an application of mortar material 38 which, at the time of manufacture, is in a plastic state. Preferably, the mortar material has the consistency of a thick paste so that when it fills the holes or indentations 36, these holes or indentations will minimize or prevent migration of the mortar material 38. It should be noted that the seal 30 has a configuration conforming to the shape of the joint 24 which thus, defines the limits of the thickness of the core member and coating 38. Preferably, the core 32 constitutes approximately 25-40 percent of the volume of the seal 30.

As shown in the FIGURE, the seal 30 may be used, in a preferred embodiment, with a tubular casing 40, which may be made of combustible material such as is disclosed in my co-pending application Ser. No. 593,981, filed July 8, 1975, now U.S. Pat. No. 3,997,090. Casing 40 is engaged in the aperture 18 of the bottom plate 16 and extends through the central aperture 34 of the core 32 and projects beyond the width of the seal 30 so that, when the gate valve closure 12 is attached to the bottom wall 2, one end of the casing 40 will extend into the passage 10 of the casing 8. With this arrangement, seepage of mortar material into the passages 10 and 18 will be prevented by the casing 40.

Prior to the attachment of the gate valve 12, which would be equipped with new elements such as at 41 and 42, to the bottom wall 2 of the casting ladle, the seal 30 of the present invention is inserted into the aperture 22 of the slide housing 14 as illustrated in the drawing. By virtue of the provision of the rigid core 32, insertion of the seal 30 is greatly facilitated. Also, by virtue of the fact that the mortar coating 38 is still in a plastic state, the seal 30 will perform its function of sealing the gap 24 without additional joint material and without undue redistribution of mortar material against the surface 26 of the casing 8. By the application of pressure, displacement of the mortar material 38 will fill out any uneven spots on the opposing surfaces of the gap.

Commercially available, chemical ceramic setting mortars can be used as the mortar material 38 of the seal 30. The core 32 preferably consists of the same mortar as used for the plastic mortar coating 38, however, in its set or hardened form. Otherwise, care must, of course, be taken so as not to select mortar materials which will produce a chemical reaction between the core 32 and the coating 38.

While the seal 30 of the present invention is stable in form, it is necessary in the case of a prolonged storage period to prevent premature hardening of the coating material 38. Thus, the seal 38 can be packaged in an air-tight container, for example, by means of a polyethylene foil or by vacuum packaging also known as shrink packaging. With some types of packaging, the packaging material can be inserted into the aperture 22 together with the seal so that, upon exposure to heat, the packaging will dissolve or evaporate.

The casing 40 may be packaged with the seal 30 not only for convenience sake, but also to give additional stability to the form of the seal.

Having described the invention, what is claimed is:

1. Sealing means for a joint between the outlet of a casting ladle and the movable closure member for said outlet, said sealing means comprising a rigid core body shaped to surround said outlet and having an aperture therethrough alignable with said outlet, said rigid core body being coated with flowable mortar material and said sealing means including a flexible air-tight package provided about said sealing means to maintain said flowable mortar material in a flowable, plastic state.

2. The sealing means as claimed in claim 1 wherein said rigid core body is provided with anchoring means.

3. The sealing means as claimed in claim 2 wherein said anchoring means comprises holes formed through said core body.

4. Sealing means for a joint between the outlet of a casting ladle of the type having a closure means, said closure means including a slide housing having an opening, a plate member having a bore therethrough, said plate member being disposed in said opening of said slide housing with one side thereof facing said outlet of said casting ladle and with said bore of said plate member in alignment with said outlet of said casting ladle, a slide plate in contact with the other side of said plate member and having a bore therethrough, said slide plate being slidable with resepct to said plate member to move said bore of said slide plate into or out of alignment with said bore of said plate member, said sealing means comprising a rigid core body having a surface for facing said outlet of said casting ladle, an opposite surface for facing said one side of said plate member, an outside peripheral edge and an aperture therethrough defined by an inner edge thereof, said aperture being alignable with said outlet of said casting ladle and said bore of said plate member, said rigid core body being coated with flowable mortar material over said surface for facing said outlet of said casting ladle, said opposite surface and said outside peripheral edge.

5. Sealing means for a joint between the outlet of a casting ladle and a plate member forming a portion of a movable closure for said outlet, said sealing means comprising a rigid core body shaped to surround said outlet and having an aperture therethrough alignable with said outlet, said rigid core body having opposite faces and an outside peripheral edge with said opposite faces and said outside peripheral edge being coated with flowable mortar material, said rigid core body having anchoring means in the form of holes formed through said core body.

* * * * *